April 8, 1952  F. A. MONAHAN  2,592,055
FLEXIBLE SHAFT

Filed Dec. 1, 1949  3 Sheets-Sheet 1

INVENTOR.
Fred A. Monahan
BY Daniel G. Cullen
Attorney

April 8, 1952  F. A. MONAHAN  2,592,055
FLEXIBLE SHAFT
Filed Dec. 1, 1949  3 Sheets-Sheet 2
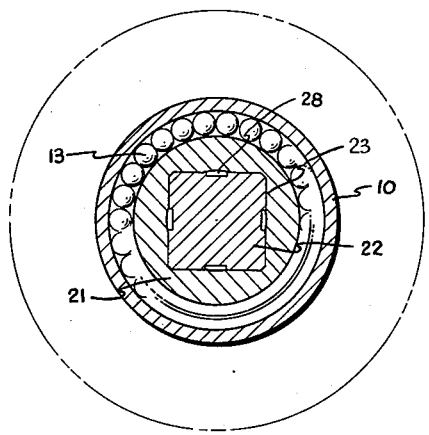
Fig. 3
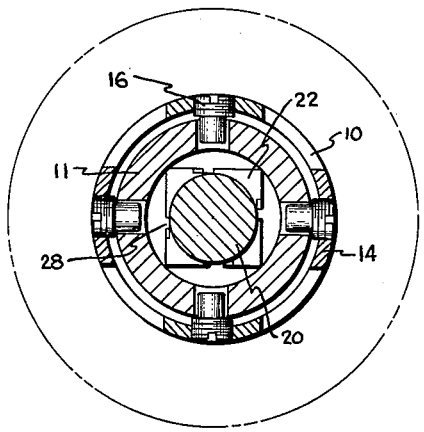
Fig. 4
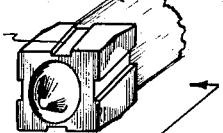
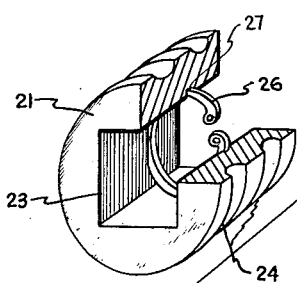
Fig. 5
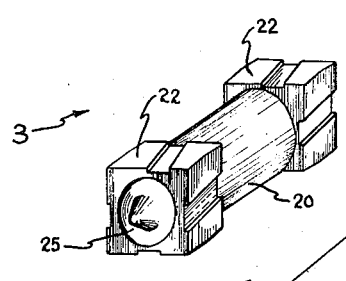
INVENTOR.
Fred A. Monahan
BY Daniel S. Cullen
Attorney April 8, 1952     F. A. MONAHAN     2,592,055
FLEXIBLE SHAFT
Filed Dec. 1, 1949     3 Sheets-Sheet 3
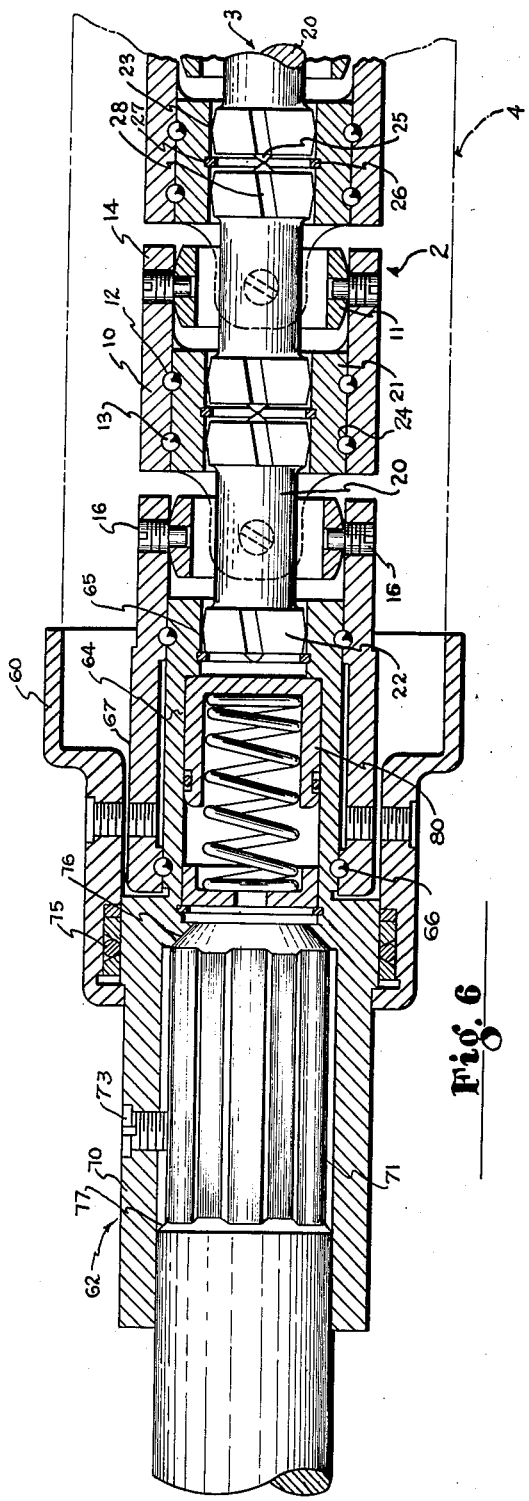
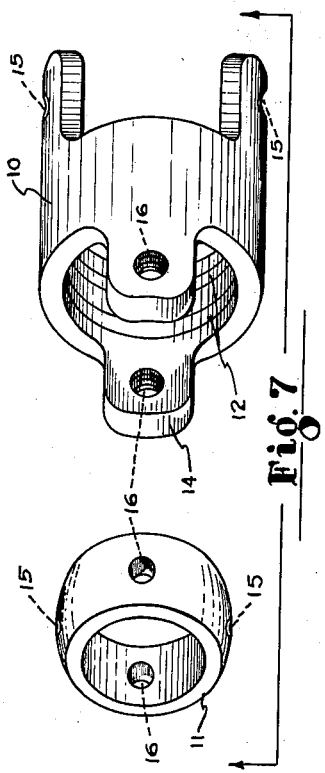
INVENTOR.
Fred A. Monahan,
BY Daniel J. Cullen
Attorney

UNITED STATES PATENT OFFICE 2,592,055

FLEXIBLE SHAFT

Fred A. Monahan, Detroit, Mich., assignor to Morris Farm Machinery Company, Detroit, Mich.

Application December 1, 1949, Serial No. 130,530

1 Claim. (Cl. 64—2)

This application discloses a flexible shaft for coupling a driving shaft to a driven shaft for transmission of rotary motion even though the axis of rotation is arranged to be shifted or curved laterally, typical of the lateral shifting that takes place in the class of devices known as flexible shafts or couplings.

The flexible shaft or coupling hereof includes an outer cover in the form of a flexible hose or tube surrounding an intermediate assembly in the form of an articulated tube of end connected rings in turn surrounding and journalling an inner or driving assembly of end connected driving links. For rotary coupling the driving and driven shafts and the end links of the inner assembly are connected, thus coupling the driving and driven shafts through the flexible shaft or coupling hereof for transmission of rotary forces.

It is one aim and object of the present invention to provide a novel form of inner assembly, which essentially comprises alternate male and female driving links, loosely connected to permit angular relative shifting.

It is another aim and object of the present invention to provide a construction wherein the outer cover is not subjected to stresses due to friction drag between the inner assembly and the articulated tube in which the inner assembly is journalled and to which the outer cover is secured.

It is a further aim and object of the present invention so to form the outer tube that it functions not as a means for confining heat within the coupling, but as an effective means for dissipating heat generated within the coupling while still retaining its function of flexing and confining the lubricant within the coupling.

To accomplish the latter aims and objects, I have provided so-called frictionless bearings, such as balls or rollers or other friction-reducing means, between the inner assembly and the articulated tube whereby substantially all friction drag between the inner assembly and the articulated tube is eliminated and have formed the outer cover in the form of a corrugated, thin, heat conducting tube, such as a tube of copper or aluminum or the like, having its ends fixed to the articulated tube. Hence, there are no forces created, to be resisted by the outer cover which, when made in the form of the corrugated copper tube above described, is not capable of resisting such forces.

An embodiment of the invention, developed in accordance with the foregoing aims and objects, is disclosed in the accompanying drawings and is described in the following specification.

Figure 1:
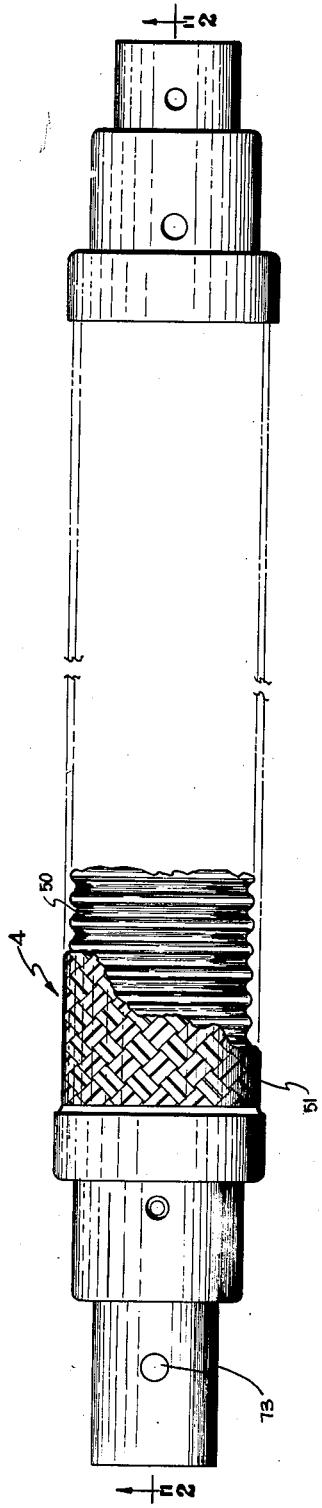
Fig. 1 is a longitudinal elevation view of one embodiment.
Figure 2:
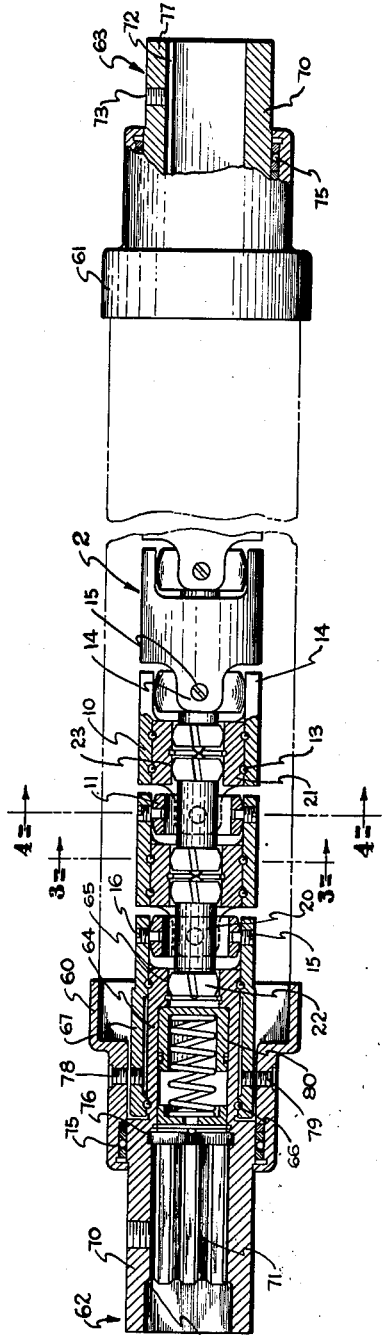
Fig. 2 is a fragmentary longitudinal cutaway view, as if on line 2—2 of Fig. 1.

Figs. 3 and 4 are transverse section views on lines 3—3 and 4—4 of Fig. 2.

Fig. 5 is an exploded perspective view of the driving links.

Fig. 6 is an enlarged longitudinal sectional view at the driving end of the flexible shaft.

Fig. 7 is an exploded view of two rings which are joined to form part of the articulated tube.

The drawings show a flexible shaft or coupling including an intermediate assembly 2, an inner assembly 3 (Fig. 5), and an outer cover 4.

The intermediate assembly

The intermediate assembly 2 is essentially an articulated tube comprising main rings 10 and supplementary rings 11. Rings 10 have inner grooves 12 receiving ball bearings 13 journalling the inner assembly 3 therein and have longitudinally extending, laterally spaced extensions 14. Transverse pins 15 and 16, diametrically opposed, connect rings 10 and 11 through extensions 14 swivelly but restrain them from longitudinal separation, to form an articulated tube serving as a bearing surface or journal for the inner assembly.

The inner assembly

The inner assembly 3 includes a plurality of end connected, alternately spaced, double male links 20 and double female links 21. Each male link 20 is in the form of a short rod having squared or non-circular male enlargements 22, and adjacent ones of these are disposed in adjacent ends of the squared or non-circular bores 23 of the links 21, these having outside grooves 24 receiving the journalling balls or bearings 13 and thus being journalled in the main rings 10 of the articulated tube. Enlargements 22 are loosely disposed in bores 23 and are crowned as shown to permit relative angular displacement of links 20—21. End teats 25 on links 20 and snap rings 26 in grooves 27 of links 21 form end thrust limitations or stops for links 20. Oil channels 28 on enlargements 22 permit and encourage longitudinal and rotary flow of oil in the articulated tube.

The outer cover and the end constructions

The outer cover 4 is in the form of a corrugated or bellows type sheet metal tube 50 characterized by its circular ribs or corrugations and protected by a braided metal sheath 51 and having its ends integrally secured to the ends of the articulated tube.

The outer cover may be of any suitable heat conducting material, copper or aluminum being preferred. It functions to provide a flexible envelope for the lubricant inside it, while dissipating heat within it.

The ribs or corrugations of tube 50 are extremely useful in accelerating heat dissipation and, at the same time, impart a high degree of flexibility to the outer covering, enabling it to flex with the flexing of the inner assembly and the articulated tube without harm to itself.

The tube 50 and its sheath 51 as a unit are bonded, as by soldering or brazing, at their ends to end fittings or rings 60—61 surrounding end adapters 62—63. Each adapter 62—63 has its inner end 64 formed like a female driving link 23, with a square internal bore 65 for an end 22 of a male driving link 20, and such end 64 is journalled, through bearing balls 66, in an end ring 67 simulating a bearing ring 10, and connected by pins 15—16 to a bearing ring 11. Each adapter 62—63 has its outer end 70 internally formed for driving connection with a driving or driven shaft, i. e., it is splined as at 71, or formed with a keyway, as at 72, with set screw holes 73 for locking set screws also being shown, whereby the driving and driven shafts may be longitudinally locked to the adapters. Oil seals 75 seal the adapters 62—63 to the rings 60—61 of the outer cover 4 in which the adapters are journalled.

Each adapter has shoulders 76—77 for endwise engagement by an end or a shoulder of the driving or driven shafts, if the set screws do not hold or are not being used, whereby end compressive forces from either the driving or driven shaft cannot be transmitted to the inner drive assembly 3 but are rather absorbed by the articulated tube 2. End separation forces obviously cannot be transmitted to the inner assembly 3. If such forces exist, they also will be absorbed by the articulated tube 2.

End ring 60 has taped holes 78—79 for lubricating and pressure relief fittings and its inner end 64 contains an oil pressure maintaining piston and spring arrangement 80.

The drive

The drive from the splined driving shaft to the keyed driven shaft is established through the splined adapter 62 (70—71—64), links 20 and 21, and the keyway adapter 63 (64—70—72), and all of the drive parts are journalled in bearing rings 67 and 10, with the outer cover 4 (50—51—60—61) secured non-rotatably to the bearing rings 67.

With the driving and driven shafts interlocked to the adapters 62—63 against relative endwise motion by the set screws or transverse bolts or pins in holes 73, engaging or passing through the driving and driven shafts to hold them, and with the adapters interlocked to the end rings 67 of the articulated tube or intermediate assembly 2 by the bearing balls 66 against relative endwise motion, it can be seen that end thrust to and from the driving and driven shafts is absorbed by the assembly 2 and is not transmitted through the drive or inner assembly 3.

For convenience of manufacture and assembly, as well as for promoting efficiency of performance, parts 10 and 21, in pairs, and parts 62—67, and parts 63—67, also in pairs, are formed as subassemblies, with each pair 10—21, 62—67, 63—67 of the parts being interlocked against relative longitudinal motion by the bearing balls 13 and 66, seated in the complementary grooves 12—24, etc. of the pairs of parts.

Now having described the flexible coupling means herein disclosed, reference should be had to the claim which follows.

I claim:

In a flexible coupling or shaft, a plurality of swivelly and end to end connected outer races angularly shiftable with respect to one another, a plurality of inner races therein, friction reducing bearings between the inner and outer races whereby the outer races journal the inner races, the inner races having non-circular inner bore portions, male driving links connecting the inner races and comprising short rods having non-circular male ends disposed in the non-circular bore portions of the inner races, with each inner race receiving adjacent ends of two links and with each link disposed in two adjacent inner races, the male ends of the links being loosely disposed in the inner bore portions of the inner races to permit relative angular displacement of the inner races and the male links, the outer races being interconnected by means of swivel rings inside which are the short rods.

FRED A. MONAHAN.

REFERENCES CITED

The following references are of record in the file of this patent:

UNITED STATES PATENTS

| Number | Name | Date |
|---|---|---|
| 416,427 | Sibley | Dec. 3, 1889 |
| 736,378 | Gay | Aug. 18, 1903 |
| 1,357,965 | De Correvont | Nov. 9, 1920 |
| 1,817,000 | Granville | Aug. 4, 1931 |

FOREIGN PATENTS

| Number | Country | Date |
|---|---|---|
| 7,176 | England | Oct. 10, 1912 |